US010860928B2

United States Patent
Mnih et al.

(10) Patent No.: US 10,860,928 B2
(45) Date of Patent: Dec. 8, 2020

(54) GENERATING OUTPUT DATA ITEMS USING TEMPLATE DATA ITEMS

(71) Applicant: DeepMind Technologies Limited, London (GB)

(72) Inventors: Andriy Mnih, London (GB); Daniel Zorn, London (GB); Danilo Jimenez Rezende, London (GB); Jorg Bornschein, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/689,065

(22) Filed: Nov. 19, 2019

(65) Prior Publication Data

US 2020/0090043 A1    Mar. 19, 2020

Related U.S. Application Data (63) Continuation of application No. PCT/EP2018/063303, filed on May 22, 2018.

(60) Provisional application No. 62/506,976, filed on May 19, 2017.

(51) Int. Cl.
  *G06N 3/08*   (2006.01)
  *G06N 3/04*   (2006.01)
(52) U.S. Cl.
  CPC ............. *G06N 3/08* (2013.01); *G06N 3/0445* (2013.01); *G06N 3/0454* (2013.01)
(58) Field of Classification Search
  CPC ....... G06N 3/08; G06N 3/0445; G06N 3/0454
  See application file for complete search history.

(56) References Cited

U.S. PATENT DOCUMENTS

2003/0033347 A1\* 2/2003 Bolle ................. G06K 9/00711
                                                                   718/107
2017/0357896 A1\* 12/2017 Tsatsin ................... G06N 3/084

OTHER PUBLICATIONS

Munkhdalai, "Neural Semantic Encoders", pp. 1-12, 2017 (Year: 2016).\*
Bartunov, "Fast Adaptation in Generative Models with Generative Matching Networks", pp. 1-16, 2017 (Year: 2016).\*
Chang, "Heterogeneous Network Embedding via Deep Architectures", 2015 (Year: 2015).\*
Andriy Mnih, "Neural Variational Inference and Learning in Belief Networks", 2014 (Year: 2014).\*
Ba et al, "Learning wake-sleep recurrent attention models" arXiv, Sep. 2015, 9 pages.

(Continued)

*Primary Examiner* — Ann J Lo
*Assistant Examiner* — Van C Mang
(74) *Attorney, Agent, or Firm* — Fish & Richardson P.C.

(57) ABSTRACT

Methods, systems, and apparatus, including computer programs encoded on a computer storage medium, for generating data items. One of the systems is a neural network system comprising a memory storing a plurality of template data items; one or more processors configured to select a memory address based upon a received input data item, and retrieve a template data item from the memory based upon the selected memory address; an encoder neural network configured to process the received input data item and the retrieved template data item to generate a latent variable representation; and a decoder neural network configured to process the retrieved template data item and the latent variable representation to generate an output data item.

20 Claims, 7 Drawing Sheets

(56) References Cited

OTHER PUBLICATIONS

Bartunov al, "Fast Adaptation in Generative Models with Generative Matching Networks" arXiv, Dec. 2016, 12 pages.
Bornschein et al, "Reweighted wake-sleep" arXiv, Apr. 2015, 12 pages.
Bornschein et al, "Variational Memory Addressing in Generative Models" arXiv, 12 pages.
Burda et al, "Importance weighted autoencoders" arXiv, Nov. 2016, 14 pages.
Das et al, "Learning context-free grammars. Capabilities and limitations of a recurrent neural network with an external stack memory" Proceedings of the Fourteenth Annual Conference of the Cognitive Science Society, 1992, 6 pages.
Dilokthanakul et al, "Deep unsupervised clustering with gaussian mixture variational autoencoders" arXiv, Jan. 2017, 12 pages.
Edwards et al, "Towards a Neural Statistician" arXiv, Mar. 2017, 13 pages.
Gemici et al, "Generative temporal models with memory" arXiv, Feb. 2017, 25 pages.
Goodfellow et al, "Generative adversarial nets" arXiv, Jun. 2014, 9 pages.
Graves et al, "Hybrid computing using a neural network with dynamic external memory" Nature, Oct. 2016, 21 pages.
Gregor, "DRAW: A recurrent Neural Network for Image Generation" arXiv, May 2015, 10 pages.
Jang et al, "Categorical Reparameterization with Gumbel-Softmax" arXiv, Nov. 2016, 12 pages.
Kingma et al, "Adam: A method for stochastic optimization" arXiv, Jan. 2017, 15 pages.
Kingma et al, "Auto-encoding variational bayes" arXiv, May 2014, 14 pages.
Kingma et al, "Improving variational inference with inverse autoregressive flow" arXiv, Jan. 2017, 16 pages.
Lake et al, "Human-level concept learning through probabilistic program induction" Nature, 2015, 8 pages.
Li et al, "Learning to Generate with Memory" arXiv, May 2016, 12 pages.
Maddison et al, "The concrete distribution: A continuous relaxation of discrete random variables" arXiv, Mar. 2017, 20 pages.
Mnih et al, "Neural variational inference and learning in belief networks" 31st International Conference on Machine Learning, 2014, 10 pages.
Mnih et al, "Variational Inference for Monte Carlo objectives" arXiv, Feb. 2016, 11 pages.
Munkdalai et al, "Neural Semantic Encoders" arXiv, Jul. 2016, 9 pages.
Nalisnick et al, "Approximate inference for deep latent gaussian mixtures" NIPS, 2016, 4 pages.
PCT International Written Opinion and Search Report in International Application No. PCT/EP2018/063303, dated Sep. 3, 2018, 17 pages.
PCT International Preliminary Report on Patentability in International Application No. PCT/EP2018/063303, dated Nov. 28, 2019, 11 pages.
Rezende et al, "One-shot generalization in deep generative models" arXiv, May 2016, 10 pages.
Rezende et al, "Stochastic backpropagation and approximate inference in deep generative models" Proceedings of the 31st International Conference on Machine Learning, May 2014, 14 pages.
Rezende et al, "Variational inference with normalizing flows" arXiv, Jun. 2016, 10 pages.
Sukhbaatar et al, "End-to-end memory networks" arXiv, Nov. 2015, 11 pages.
Zaremba et al, "Reinforcement Learning Neural Turing Machines" arXiv, Jan. 2016, 14 pages.

* cited by examiner

GENERATING OUTPUT DATA ITEMS USING TEMPLATE DATA ITEMS

CROSS-REFERENCE TO RELATED APPLICATIONS

This application is a continuation of and claims priority to PCT Application No. PCT/EP2018/063303, filed on May 22, 2018, which claims priority to U.S. Provisional Application No. 62/508,976, filed on May 19, 2017. The disclosures of the prior applications are considered part of and are incorporated by reference in the disclosure of this application.

BACKGROUND

This specification relates to neural network system architectures comprising a memory. In particular, this specification relates to generating data items using such neural network system architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations the neural network system comprising: a memory storing a plurality of template data items; one or more processors configured to: select a memory address based upon a received input data item; and retrieve a template data item from the memory based upon the selected memory address; an encoder neural network configured to process the received input data item and the retrieved template data item to generate a latent variable representation; and a decoder neural network configured to process the retrieved template data item and the latent variable representation to generate an output data item.

Aspects may include one or more of the following features. The processors may be further configured to select the memory address based upon a similarity score associated with the received input data item and the plurality of template data items stored in the memory. The system may further comprise: a first embedding neural network configured to process the received input data input to generate a first representation of the input data item; a second embedding neural network configured to process a template data item to generate a second representation of the template data item; and wherein the one or more processors are further configured to select the memory address based upon a similarity score associated with the first representation of the input data item and respective second representations of the plurality of template data items stored in the memory.

The one or more processors may be further configured to select the memory address based upon a probability distribution over the similarity scores. The similarity score may be based upon one of the following: an inner product, a cosine similarity and an L2-distance. The plurality of template data items may be generated based upon a training data set. The plurality of template data items may be learned from the training data set. The plurality of template data items may be generated based upon a selection of data items from the training data set, the selection based upon a classification of the data.

The first embedding neural network and the second embedding neural network may share at least a portion of their respective weights. The first and second embedding neural networks may be the same neural network. The first and second representations may be of the same form.

The encoder neural network and the decoder neural network may be based upon a variational autoencoder framework. The encoder neural network may comprise an encoder portion of a variational autoencoder. The decoder neural network may comprise a decoder portion of the variational autoencoder. The encoder and decoder neural network may together comprise a variational autoencoder. The encoder neural network and the decoder neural network may be trained based upon optimizing a variational lower bound.

The output data item may be of the same classification as the input data item. The output data item may be an example of a data item of the same type as the input data item. The output data item may be a data item representing variation of the input data item. The input data item may be a data item of a category selected from the group consisting of: image data, video data, motion data, speech data, audio data, an electronic document, data representing a state of an environment and data representing an action. One or more of the encoder neural network, decoder neural network, first embedding neural network and second embedding neural network may comprise a recurrent neural network.

The training data set may comprise exemplary data items belonging to a plurality of classes or categories. A template data item may be a data item representative of a class in the training data set. The template data item may be one of the data items in the training data set or the template data item may be learned from the training data set. The plurality of template data items may be generated such that there is at least one template data item per class in the training data set. The plurality of template data items may comprise an even distribution of template data items belonging to each class. The plurality of template data items may be randomly selected from the training data set. The plurality of template data items may be updated over time or remain constant over time. The plurality of template data items may provide a context associated with an input data item.

The plurality of template data items may model a portion of the variation in the training data set. The neural network system may model a portion of the variation in the training data set based upon the plurality of template data items. The plurality of template data items and the neural network system, in combination, may model a substantial portion of the variation in the training data set.

The neural network can be configured to receive any kind of digital data input and to generate any kind of score, classification, or regression output based on the input.

For example, if the inputs to the neural network are images or features that have been extracted from images, the output generated by the neural network for a given image may be an image of an object belonging to a category or classification associated with the input image. Additionally or alternatively the output may be used to obtain scores for each of a set of object categories, with each score representing an estimated likelihood that the image contains an image of an object belonging to the category.

As another example, if the input to the neural network is a sequence of text in one language, the output generated by the neural network may be text sharing at least some properties with the input text. Alternatively or additionally the output may be used to generate a score for each of a set of pieces of text in another language, with each score representing an estimated likelihood that the piece of text in the other language is a proper translation of the input text into the other language. As another example, if the input to the neural network is a sequence representing a spoken utterance, the output generated by the neural network may be a spoken utterance sharing at least some properties with the input spoken utterance. Additionally or alternatively the output may be used to generate a score for each of a set of pieces of text, each score representing an estimated likelihood that the piece of text is the correct transcript for the utterance.

As well as being applied to image and text generation tasks, the system may further be applied to image classification tasks, image paintings, speech generation tasks, or image segmentation tasks.

In addition, the system may be used to generate a predicted observation of an environment. The predicted observations may be ordered collections of numerical values that characterize predicted future or related states of the environment.

An agent performing actions may interact with the environment. For example, the environment may be a simulated environment and the agent may be implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation. In these implementations, the actions may be points in a space of possible control inputs to control the simulated user or simulated vehicle. Additionally, or alternatively, the neural network system may be used to generate actions for the agent.

As another example, the environment may be a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment.

As a further example, the environment may be a user-specific environment. For example, the environment can be a patient health environment, e.g., for computer-assisted diagnosis, and the predicted observations can be predicted electronic medical data that characterize the health of the patient. As another example, the environment can be a recommendation environment, and the predicted observations can be feature vectors that characterize predicted preferences and interests of a user.

As another example, the environment is an art environment. For example, the environment can be a musical environment, and the predicted observations can be sequences of one or more musical notes. As another example, the environment can be a visual artistic environment, such as a representation of a painting canvas, and the predicted observations can be, for example, paint brush strokes (with a particular color and brush).

The system may also be used for anomaly detection. For example, the system can be used to generate a database of different predicted observations of the environment. A previously unseen observation of the environment can be characterized as an anomaly if it is sufficiently different (according to some appropriate measure) from the predicted observations in the database.

The subject matter described in this specification can be implemented in particular embodiments so as to realize one or more of the following advantages.

The system may be used to generate data items that are of the same classification as the input data item and that cannot be easily distinguished from real data.

The system is especially advantageous where limited amounts of data are available. In such situations, a conventional generative model may fail to capture all of the variations in the data due to the limited number of examples available. By utilizing a memory storing a plurality of template data items, part of the variation in a data set may be modelled by the plurality of template data items and the neural network system can model the remaining variation. That is, the template data item may provide a context associated with the input data item that is used by the neural network system to model the remaining variation.

In addition, the system provides a separation between address selection and modelling the variation in the data. By comparison, prior art systems that include memory may select addresses based upon the latent variable representation, requiring the latent variable representation to serve as both an address selection means and to model the variation of the data.

Furthermore, by selecting a memory address in the manner as described, improved and more efficient methods of training a neural network system such as variational inference based training may be utilized. The subject matter may provide for effective training of a neural network system that uses a smaller data set than conventional neural network techniques. Therefore, fewer computational resources such as processing power, memory and storage are required to train the neural system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
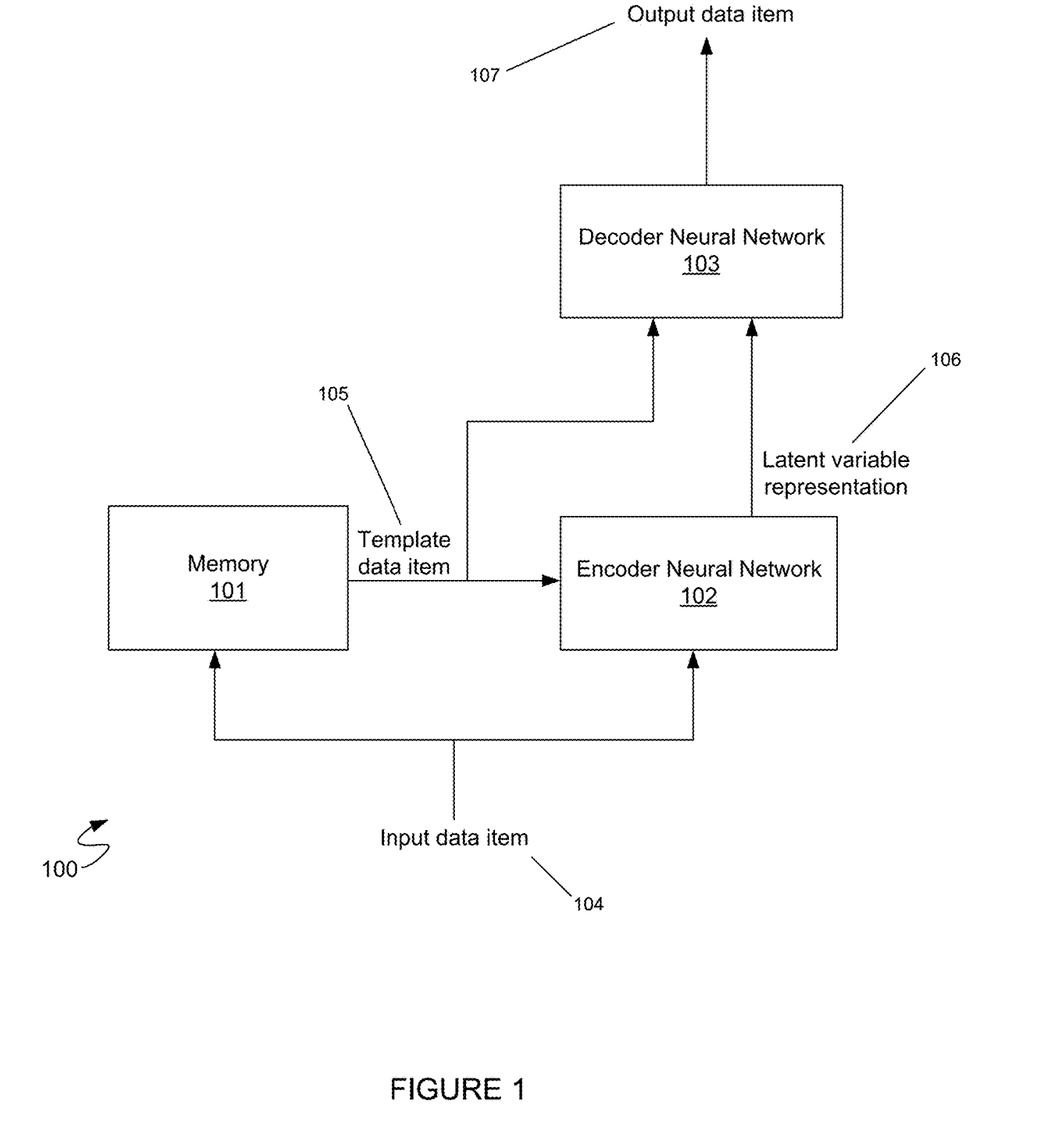
FIG. 1 shows an example neural network system.

FIG. 1 shows an example neural network system 100 suitable for generating a data item. The neural network system 100 is capable of modelling data such that new data items may be generated from the model that cannot be easily distinguished from real data. The neural network system 100 may be a generative model.

The neural network system 100 may model data based upon classes or categories with which the modelled data is associated and the neural network system 100 may generate new data items associated with a modelled class or category. The neural network system 100 may model data such as image data, video data, motion data, speech data, audio data, an electronic document, data representing a state of an environment and data representing an action. For example, the neural network system 100 may model a plurality of object classes and given an input image of an object of a particular class of the plurality of object classes, the neural network system 100 may generate an image belonging to the particular class of the object in the input image.

In general, the neural network system 100 comprises a memory 101, an encoder neural network 102 and a decoder neural network 103.

The memory 101 is configured to store a plurality of template data items. A template data item may be a data item associated with a particular class of modelled data and the memory 101 may store one or more template data items associated with each class of data modelled by the neural network system 100. The template data items stored in the memory 101 may be data items selected from a training data set or may be learned, for example, through a training process described below with reference to FIG. 5.

A template data item may be retrieved from the memory 101 using a corresponding memory address. In the neural network system 100, a memory address is selected based upon an input data item 104 and the corresponding template data item 105 associated with the selected address is retrieved. Selection of a memory address based upon an input data item 104 is described in more detail below with reference to FIG. 2.

The encoder neural network 102 is configured to process the input data item 104 and the retrieved template data item 105 to generate a latent variable representation 106. The latent variable representation 106 may represent latent factors of variation that account for variability in the input data item 104 relative to the template data item retrieved from the memory 101.

The decoder neural network 103 is configured to process the retrieved template data item 105 and the latent variable representation 106 to generate an output data item 107. The template data item 105 may provide a context for the latent variable representation 106 in the generation of an output data item 107.

The plurality of template data items stored in the memory 101 may model a portion of the variation of the modelled data whilst the encoder neural network 102 and/or the decoder neural network 103 may model remaining variation. In this way, the model is capable of generalizing even where only a limited number of example data items are available to train the model. An effective model may therefore be provided based upon a limited training dataset.

Furthermore, the system provides a separation between address selection and modelling the variation in the data. By comparison, some prior art systems that include memory may select addresses based upon the latent variable representation, requiring the latent variable representation to serve as both an address selection means and to model the variation of the data, thereby reducing the effectiveness of the model.

The encoder neural network 102 and the decoder neural network 103 may be any suitable type of neural network, for example, a convolutional neural or a recurrent neural network. The encoder neural network 102 and the decoder neural network 103 may be based upon a variational auto-encoder framework with the encoder neural network 102 and the decoder neural network 103 respectively forming the encoder and decoder portions of a variational autoencoder. The encoder neural network 102 may represent a conditional Gaussian distribution and the latent variable representation 106 may be generated by sampling from the distribution. As explained in more detail below with reference to FIG. 5, the encoder neural network 102 and decoder neural network 103 may be trained based upon optimizing a variational lower bound.

Figure 2:
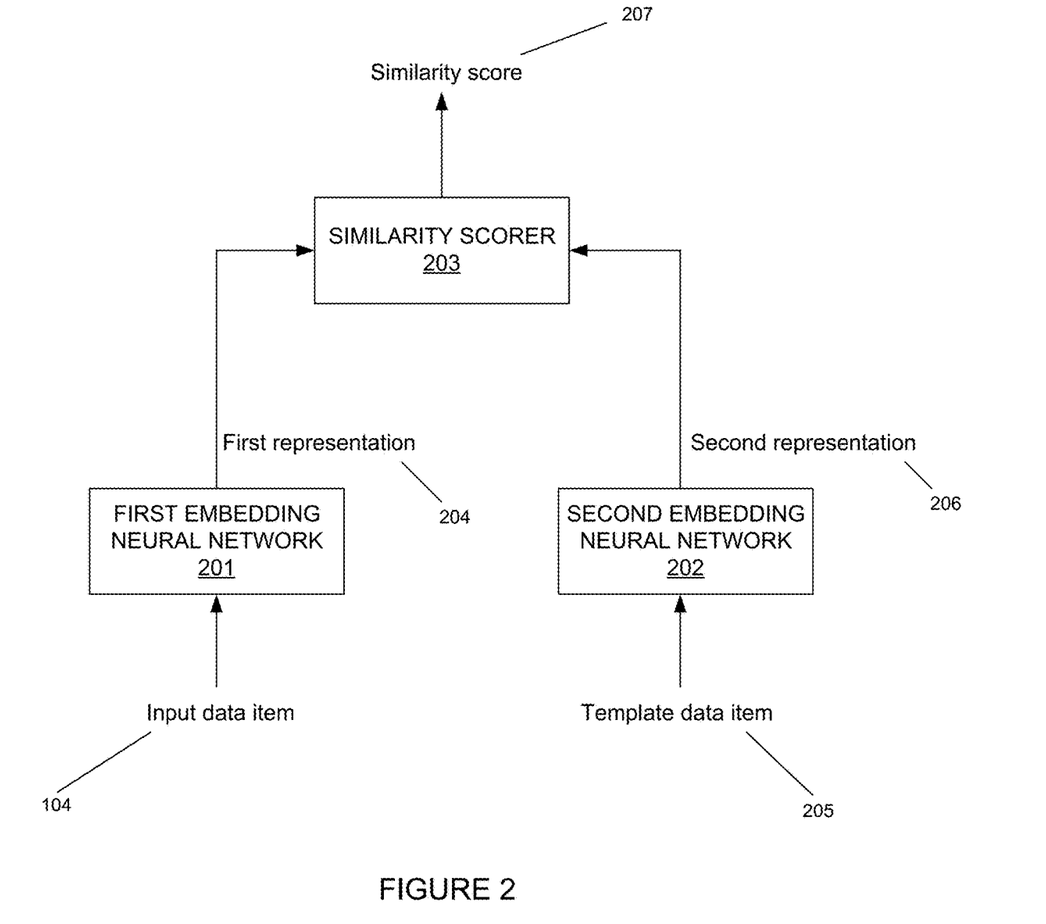
FIG. 2 shows optional components of the example neural network system.

FIG. 2 shows a first embedding neural network 201, a second embedding neural network 202 and similarity scorer 203 for selecting a memory address from the memory 101 based upon an input data item 104. The first embedding neural network 201, second embedding neural network 202 and similarity scorer 203 may form part of the neural network system 100 of FIG. 1.

The first embedding neural network 201 is configured to process the input data item 201 to generate a first representation 204 of the input data item 104. The second embedding neural network 202 is configured to process a template data item 205 from the memory 101 to generate a second representation 206 of the template data item 205. The first embedding neural network 201 and the second embedding neural network 202 may take any suitable form, for example, a multi-layer perceptron (MLP). The first embedding neural network 201 and the second embedding neural network 202 may share at least a portion of their respective weights.

The similarity scorer 203 is configured to compute a similarity score 207 based upon a comparison of the first representation 204 and the second representation 206. The similarity score may be computed based upon an inner product between the first representation 204 and the second representation 206. The inner product may be normalized, for example, using the L2-norm of the second representation 206. Alternatively, the similarity score 207 may be computed based upon a cosine similarity, an L2-distance or any other suitable similarity measure.

It will be appreciated that as the similarity score 203 is computed based upon the outputs of the first embedding neural network 201 and the second embedding neural network 202, the similarity scoring function as a whole is parameterized by the first embedding neural network 201 and the second embedding neural network 202 and thus may be a learned function. The first embedding neural network 201 and the second embedding neural network 202 may be trained together with the encoder neural network 102 and the decoder neural network 103, as described in detail below with reference to FIG. 5.

A similarity score 207 may be computed for each template data item stored in the memory 101 and the input data item 104. A probability distribution over the plurality of memory addresses conditioned on the input data item 104 may be constructed based upon the computed similarity scores, for example, by applying a softmax function to the computed similarity scores. A memory address may then be selected based upon the input data item 104 by sampling an address from the constructed probability distribution. That is, the memory address and the template data item 105 retrieved from the memory 101 may be selected stochastically. In this way, the memory address being a stochastic latent variable may form part of the generative model and allows the retrieved template data item 105 to be used directly in the generation of the output data item 107 by the decoder neural network 103.

It will be appreciated that the contents of the memory 101 and/or the size of the memory 101 may be modified without having to relearn the parameters of the model (i.e. the parameters of any of the neural networks of the system 100).

Figure 3:
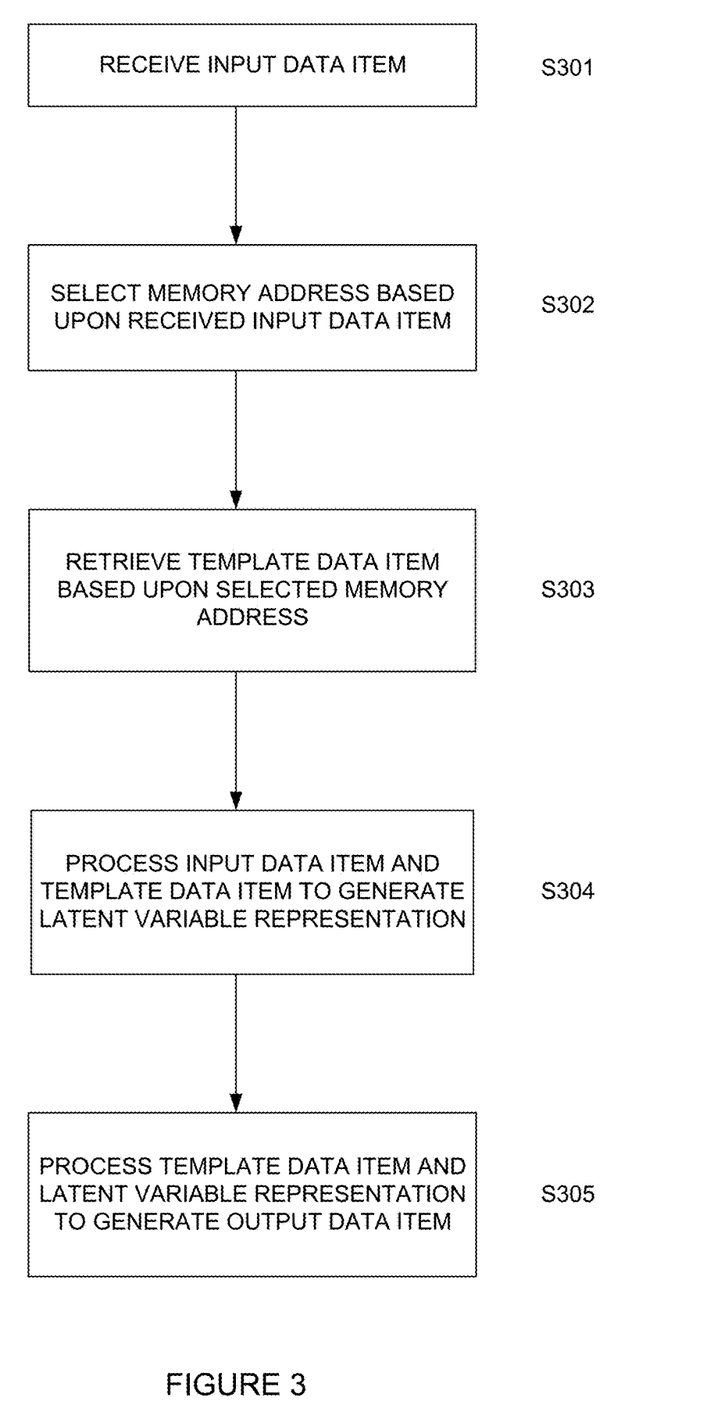
FIG. 3 is a flow diagram of an example process for generating a data item.

Referring now to FIG. 3, a process for generating a data item is shown. The processing of FIG. 3 may be carried out using the neural network system 100.

At step S301, an input data item 104 is received. The input data item 104 may be associated with a particular class or category of data. The input data 104 may, for example, be image data, video data, motion data, speech data, audio data, an electronic document, data representing a state of an environment, data representing an action and other suitable forms of data.

At step S302, a memory address is selected based upon the input data item 104 received in step S301. An example process of selecting a memory address is described below with reference to FIG. 4.

At step S303, a template data item 105 is retrieved from memory 101 based upon the selected memory address. As described above, the memory 101 may store a plurality of template data items and may comprise one or more template data items associated with each class or category of modelled data.

Processing continues at step S304 where the received input data item 104 and the template data item 105 are processed to generate a latent variable representation 106. Such processing may be carried out by the encoder neural network 102 as described above.

At step S305, the template data item 105 and the latent variable representation 106 are processed to generate an output data item 107. The processing of step S305 may be carried out by the decoder neural network 103 as described above. The output data item 107 may be associated with the same class or category of the input data item 104.

Figure 4:
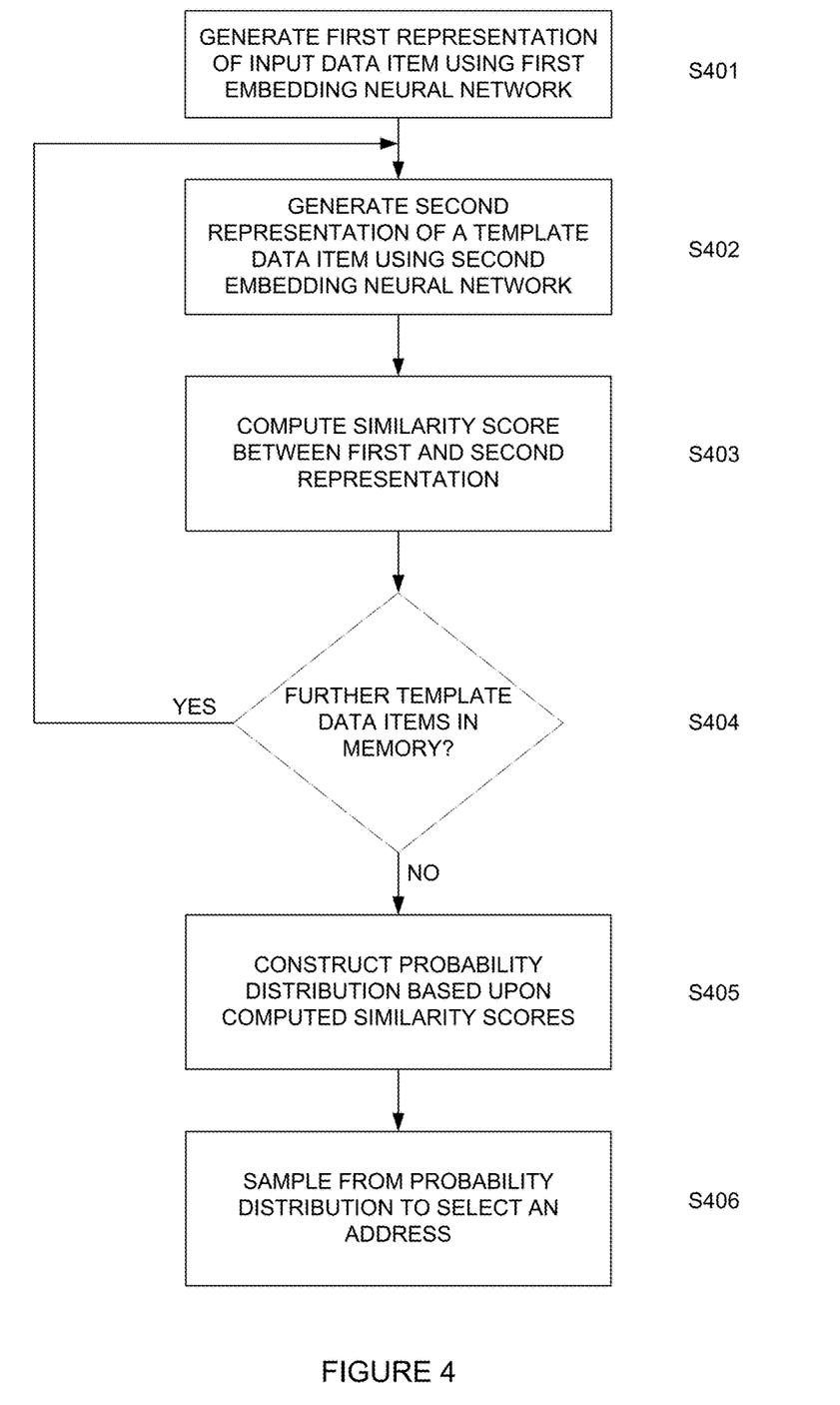
FIG. 4 is a flow diagram of an example process selecting a memory address.

Referring now to FIG. 4, a process for selecting an address based upon an input data item 104 is described. As will be appreciated, the process of FIG. 4 may be implemented using the components of FIG. 2.

At step S401, a first representation 204 of the input data item 104 received at step S301 is generated. The first representation 204 may be generated using the first embedding neural network 201.

At step S402, a second representation 206 of a template data item stored in memory 101 is generated. The second representation 206 may be generated using the second embedding neural network 202.

At step S403, a similarity score 207 is computed by comparing the first representation 204 and the second representation 206. The similarity score 207 may be computed by the similarity scorer 203 as described above. For example, the similarity score may be computed based upon an inner product between the first representation 204 and the second representation 206. The inner product may be normalized, for example, using the L2-norm of the second representation. Alternatively, the similarity score 207 may be computed based upon a cosine similarity, an L2-distance or any other suitable similarity measure.

Steps S402 and S403 are repeated for each template data item stored in the memory 101. If there are no further template data items to be processed, as shown in decision S404, at step S405 a probability distribution is constructed based upon the similarity scores computed at step S403 for each template data item. As described above, the probability distribution may, for example, be constructed by applying a softmax function to the computed similarity scores 207.

At step S406, an address is selected by sampling from the probability distribution constructed at step S405.

An exemplary process for training the neural network system 100 is described with reference to FIG. 5. The process may use a training data set comprising a set of input data items for training. The target data item for each input data item may be the input data item itself or a variation of the input data item or any other suitable target. The training data set may comprise labelled data or unlabeled data or a combination of labelled and unlabeled data. As described above, advantageously, the neural network system 100 may be trained using a training data set comprising a limited number of example data items and is suitable for "few-shot" learning and even "one-shot" learning scenarios.

Figure 5:
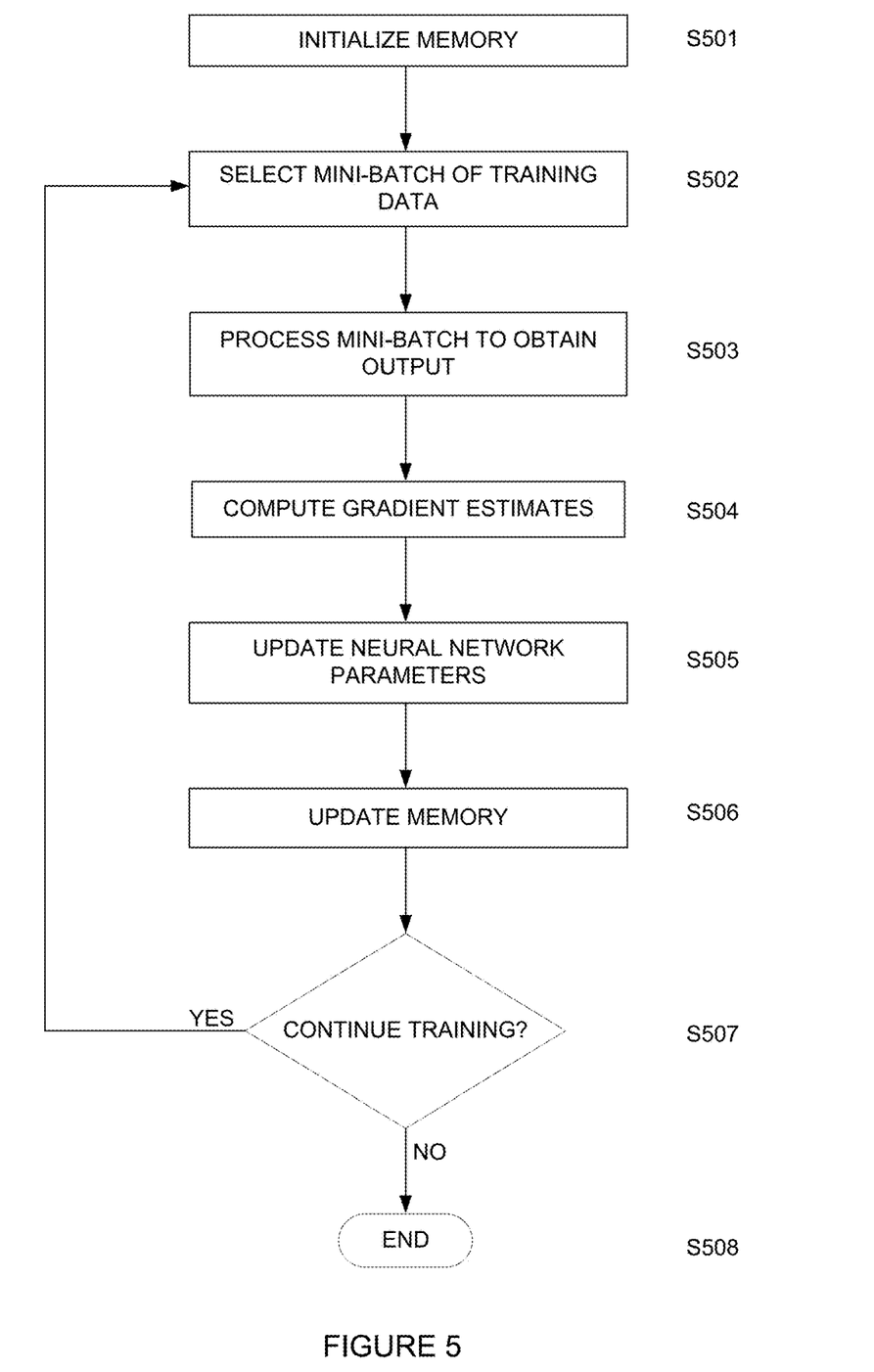
FIG. 5 is a flow diagram of an example process for training the neural network system.

Referring now to FIG. 5, at step S501, the memory 101 is initialized. The memory 101 may be initialized by populating the memory 101 with template data items selected from the training data set. The selection of template data items may be a random selection. Alternatively, the memory 101 may be initialized using random values for each template data item and updated appropriately during the training process in order to learn appropriate template data items as described below. It will be appreciated that for the purposes of learning appropriate template data items, initialization by selection from the training data set is also possible.

At step S502, a "mini-batch" of training data is selected. That is, a subset of the plurality of data items is selected from the training data set. The subset typically is selected so as to include a relatively small number of the training data items. Where the template data items in the memory 101 are selected from the training data set and the class of each of the data items in the training data set is known, the mini-batch of training data is selected such that each data item in the mini-batch has a corresponding template data item in the memory 101 of a corresponding class. Alternatively, the template data items in the memory 101 may be initialized such that there is a correspondence with the selected data items in the mini-batch. For example, the template data items may be generated based upon the selected data items.

At step S503, each training data item in the mini-batch is processed to generate output data in accordance with the process of FIG. 3 described above. As described above, the target output data item may be the training data item itself or a variation of the training data item or any other suitable target.

At step S504, gradient estimates are computed based upon optimization of a loss function. As indicated above, the neural network system 100 is a generative model. As will be appreciated, gradient estimates may be computed using variational inference methods and as such, the loss function may be based upon a variational lower bound. An exemplary loss function and equations for computing gradient estimates are provided below.

At step S505, the gradient estimates are used to update the parameters of the neural networks of the neural network system 100. That is, the parameters of the encoder neural network 102 and the parameters of the decoder neural network 103 are updated. The parameters of the first embedding neural network 201 and the parameters of the second embedding neural network 202 may also be updated.

At step S506, the memory 101 is optionally updated. For example, if the template data items in the memory 101 are to be learned, gradient estimates for the memory 101 may also be computed and the template data items updated based upon the computed gradient estimates. If the template data items are selected from the training data set, the memory 101 may be updated with a new selection of template data items from the training data set for processing the next mini-batch of training data. As will be appreciated, updating the memory with a new selection of template data items from the training data set may be performed at any stage prior to processing the next mini-batch of training data. Alternatively, the memory may be persistent throughout the training process and may not be updated.

At step S507 it is determined whether to continue training. The determination may be based upon whether the value of the loss has sufficiently converged and is below a threshold value or may be based upon whether a particular number of mini-batches has been processed or based upon any other suitable criteria. If it is determined that training is to continue, processing returns to step S502 to process another mini-batch of training data. Otherwise the process is completed and the trained system may be output for processing of further data items.

An exemplary loss function and equations for computing gradients will be now provided. The description below is a high-level description. A more detailed description can be found in Jörg Bornschein, Andriy Mnih, Daniel Zoran, Danilo J. Rezende, "Variational Memory Addressing in Generative Models" (arXiv: 1709.07116), which is hereby incorporated by reference in its entirety.

The generative model implemented by the neural network system 100 may be described according to equation (1) below:

$$p(x \mid M) = \sum_a p(a \mid M) \int_z p(z \mid m_a) p(x \mid z, m_a) dz \quad (1)$$

wherein, x is the data item to be modelled, a is the memory address as a categorical latent variable, z is the latent variable representation, M is the memory 101 and $m_a$ is the template data item associated with memory address a.

The model may be based upon a variational autoencoder framework and may be trained based upon variational inference, for example, using methods disclosed in Diederik P. Kingma, Max Welling, "Auto-encoding Variational Bayes" (arXiv: 1312.6114). Using variational inference, the model may be trained by optimizing a variational lower bound which. As will be appreciated, for the model in equation (1), the variational lower bound may be written as:

$$\log p(x \mid M) \geq \mathbb{E}_{a,z \sim q(\cdot \mid M, x)}[\log p(x, z, a \mid M) - \log q(a, z \mid M, x)] \quad (2)$$

$$\text{where } q(a, z \mid M, x) = q(a \mid M, x) q(z \mid m_a, x). \quad (3)$$

Given that a memory address is a discrete latent variable, it is not possible to use backpropagation. As such, gradients may be computed based upon the methods disclosed in Andriy Mnih, Danilo J. Rezende, "Variational Inference for Monte Carlo Objectives" (arXiv: 1602.06725). For example, a multi-sample version of the variational bound, may be used as a loss function, $\mathcal{L}$, which may have the following form (M omitted for brevity):

$$\log p(x) \geq \mathbb{E}_{\substack{a^{(k)} \sim q(a \mid x) \\ z^{(k)} \sim q(z \mid m_a, x)}} \left[ \log \frac{1}{K} \sum_{k=1}^{K} \frac{p(x, m_a, z)}{q(a, z \mid x)} \right] = \mathcal{L} \quad (4)$$

As will be appreciated, based upon the above loss function, the gradient estimates for the generative part of the model, θ, and the inference part of the model, φ, may be computed as follows:

$$\nabla_\theta \mathcal{L} \simeq \sum_{a^{(k)}, z^{(k)} \sim q(\cdot \mid x)} \omega^{(k)} (\nabla_\theta \log p_\theta(x, a^{(k)}, z^{(k)}) - \nabla_\theta \log q_\theta(z \mid a, x)) \quad (5)$$

$$\nabla_\phi \mathcal{L} \simeq \sum_{a^{(k)}, z^{(k)} \sim q(\cdot \mid x)} \omega_\phi^{(k)} \nabla_\phi \log q_\phi(a^{(k)} \mid x)$$

$$\text{with } \omega^{(k)} = \frac{\tilde{\omega}^{(k)}}{\sum_k \tilde{\omega}^{(k)}}, \tilde{\omega}^{(k)} = \frac{p(x, a^{(k)}, z^{(k)})}{q(a^{(k)}, z^{(k)} \mid x)}$$

$$\text{and } \omega_\phi^{(k)} = \log \frac{1}{K} \sum_{k'} \tilde{\omega}^{(k')} - \log \frac{1}{K-1} \sum_{k' \neq k} \tilde{\omega}^{(k')} - \omega^{(k)}$$

As will be appreciated, the gradients ∇ log p(x|z, a) may be used to update the contents of the memory if required, and the gradients ∇ log p(a) and ∇ log q(a|x) may be used to update the parameters of the first embedding neural network 201 and the second embedding neural network 202.

An exemplary neural network system was trained using a data set of images of handwritten characters from a plurality of different alphabets and used to generate images based upon character classes in the data set.

Figure 6A:
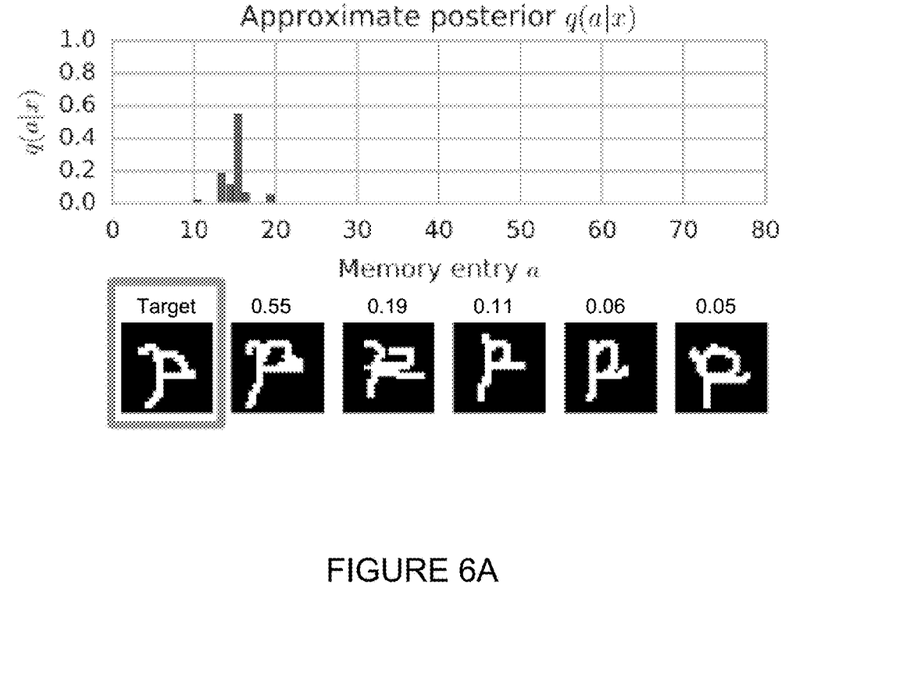
FIGS. 6A and 6B each show the five template data items with the highest probability for a random input data item.
Figure 6B:
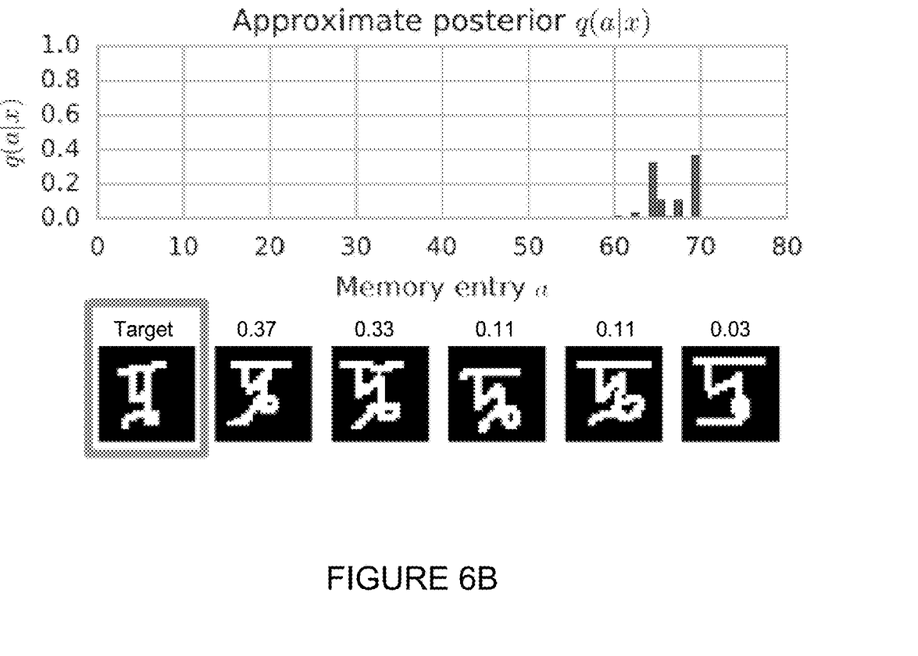

FIGS. 6A and 6B each show the five template data items with the highest probability for a random input data item (target). Also shown is the corresponding probability distribution constructed for selecting a memory address. In this example, the memory contains 10 template data items for each of 8 unseen test set character classes. As demonstrated by FIGS. 6A and 6B, the model performs reliable approximate inference over memory locations.

Figure 7:
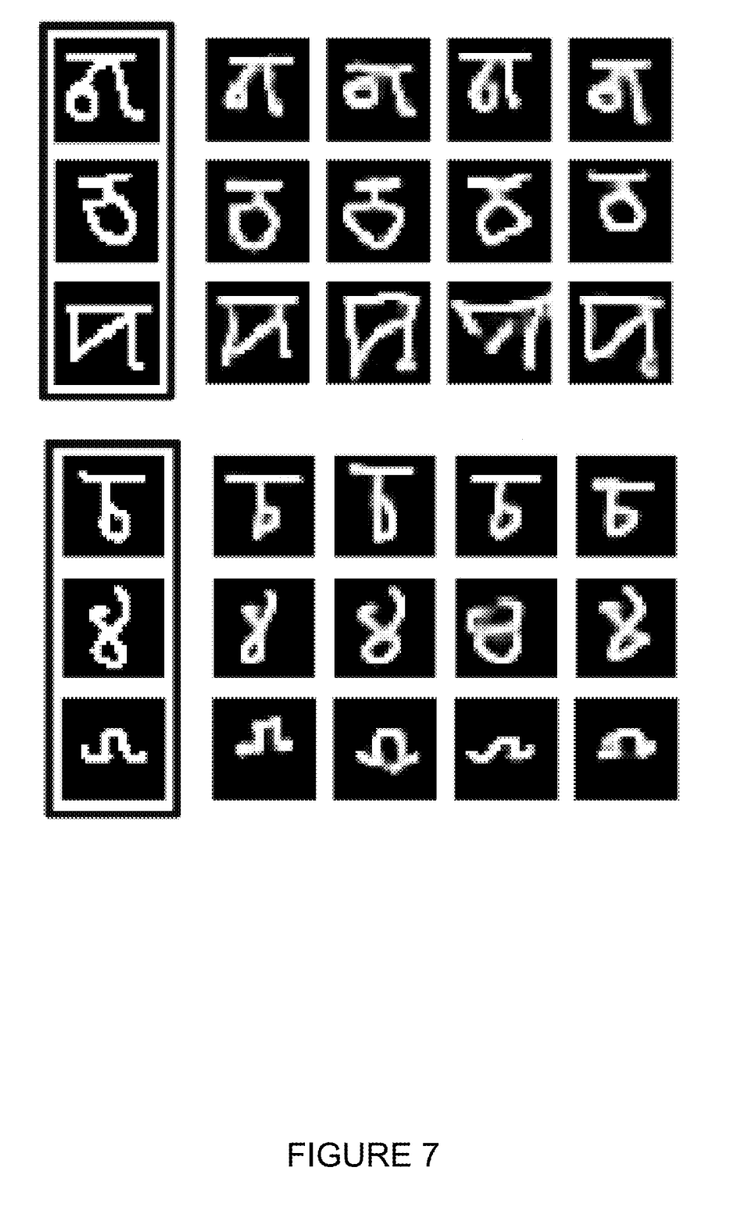
FIG. 7 shows an example neural network being tested.

In FIG. 7, an exemplary neural network system is tested under a "one-shot" problem setting. In this example, a neural network system was trained using four examples from eight classes each per gradient step. The left-most column shows exemplary template data items containing a single example of a test set character class. The other images shown in FIG. 7 are exemplary images generated by the exemplary neural network system based upon the corresponding template data items. As demonstrated by FIG. 7, the neural network system is able to generalize even in "one-shot" settings.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A neural network system implemented by one or more computers, the neural network system comprising:
one or more memories storing a plurality of template data items, each of the plurality of template data items corresponding to a respective memory address;
one or more computers and one or more storage devices storing instructions that when executed by the one or more computers cause the one or more computers to perform operations comprising:
receiving an input data item;
selecting a memory address based upon the received input data item; and
retrieving the template data item corresponding to the selected memory address from the memory;
providing the retrieved template data item retrieved from the memory and the received input data item as input to an encoder neural network that is configured to process the received input data item and the retrieved template data item to generate a latent variable representation that represents latent factors of variation that account for variability in the input data item relative to the retrieved template data item;
obtaining as output from the encoder neural network the latent variable representation that represents latent factors of variation that account for variability in the input data item relative to the retrieved template data item;
providing the latent variable representation and the retrieved template data item as input to a decoder neural network configured to process the retrieved template data item and the latent variable representation to generate an output data item; and
obtaining as output from the decoder neural network the output data item.

2. The system of claim 1, wherein selecting a memory address comprises selecting the memory address based upon a respective similarity score for each of the plurality of template data items stored in the memory that measure similarity between the template data item and the received input data item.

3. The system of claim 2, the operations further comprising:
providing the received input data item as input to a first embedding neural network configured to process the received input data input to generate a first representation of the input data item;
providing each of the template data items as input to a second embedding neural network configured to process each of the template data items to generate a respective second representation of each of the template data items; and
wherein selecting the memory address comprising computing the respective similarity scores based upon the first representation of the input data item and the respective second representations of the plurality of template data items stored in the memory.

4. The system of claim 2, wherein selecting the memory address further comprises selecting the memory address by sampling from a probability distribution over the respective similarity scores.

5. The system of claim 2, wherein the respective similarity score is based upon one of the following: an inner product, a cosine similarity and an L2-distance.

6. The system of claim 1, wherein the plurality of template data items are generated based upon a training data set.

7. The system of claim 6, wherein the plurality of template data items are learned from the training data set.

8. The system of claim 6, wherein the plurality of template data items are generated based upon a selection of data items from the training data set, the selection based upon a classification of the data.

9. The system of claim 3, wherein the first embedding neural network and the second embedding neural network share at least a portion of their respective weights.

10. The system of claim 1, wherein the encoder neural network and the decoder neural network are based upon a variational autoencoder framework.

11. The system of claim 10, wherein the encoder neural network comprises an encoder portion of a variational autoencoder and the decoder neural network comprises a decoder portion of the variational autoencoder.

12. The system of claim 10, wherein the encoder neural network and the decoder neural network are trained based upon optimizing a variational lower bound.

13. The system of claim 1, wherein the output data item is of the same classification as the input data item.

14. The system of claim 1, wherein the input data item is a data item of a category selected from the group consisting of: image data, video data, motion data, speech data, audio data, an electronic document, data representing a state of an environment and data representing an action.

15. The system of claim 1, wherein one or more of the encoder neural network or the decoder neural network comprises a recurrent neural network.

16. A method of generating a data item, comprising:
receiving, by one or more computers, an input data item;
selecting, by the one or more computers, a memory address based upon the received input data item, the selected memory address corresponding to one of a plurality of template data items stored in one or more memories;
retrieving, by the one or more computers and from the one or more memories, the template data item corresponding to the selected memory address;
providing the retrieved template data item retrieved from the memory and the received input data item as input to an encoder neural network that is configured to process the received input data item and the retrieved template data item to generate a latent variable representation that represents latent factors of variation that account for variability in the input data item relative to the retrieved template data item;
obtaining as output from the encoder neural network the latent variable representation that represents latent factors of variation that account for variability in the input data item relative to the retrieved template data item;
providing the latent variable representation and the retrieved template data item as input to a decoder neural network configured to process the retrieved template data item and the latent variable representation to generate an output data item; and
obtaining as output from the decoder neural network the output data item.

17. One or more non-transitory computer-readable storage media storing instructions that when executed by one or more computers cause the one or more computers to implement a neural network system, the neural network system comprising:
one or more memories storing a plurality of template data items, each of the plurality of template data items corresponding to a respective memory address;
one or more computers and one or more storage devices storing instructions that when executed by the one or more computers cause the one or more computers to perform operations comprising:
receiving an input data item;
selecting a memory address based upon the received input data item; and
retrieving the template data item corresponding to the selected memory address from the memory;
providing the retrieved template data item retrieved from the memory and the received input data item as input to an encoder neural network that is configured to process the received input data item and the retrieved template data item to generate a latent variable representation that represents latent factors of variation that account for variability in the input data item relative to the retrieved template data item;
obtaining as output from the encoder neural network the latent variable representation that represents latent factors of variation that account for variability in the input data item relative to the retrieved template data item;
providing the latent variable representation and the retrieved template data item as input to a decoder neural network configured to process the retrieved template data item and the latent variable representation to generate an output data item; and
obtaining as output from the decoder neural network the output data item.

18. The method of claim 16, wherein selecting a memory address comprises selecting the memory address based upon a respective similarity score for each of the plurality of template data items stored in the memory that measure similarity between the template data item and the received input data item.

19. The method of claim 18, further comprising:
providing the received input data item as input to a first embedding neural network configured to process the received input data input to generate a first representation of the input data item;
providing each of the template data items as input to a second embedding neural network configured to process each of the template data items to generate a respective second representation of each of the template data items; and
wherein selecting the memory address comprising computing the respective similarity scores based upon the first representation of the input data item and the respective second representations of the plurality of template data items stored in the memory.

20. The method of claim 18, wherein selecting the memory address further comprises selecting the memory address by sampling from a probability distribution over the respective similarity scores.

* * * * *